Jan. 17, 1950 J. HAANTJES 2,494,657
AMPLIFIER COUPLING NETWORK
Filed Feb. 11, 1947
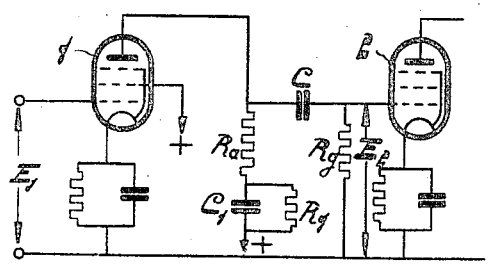
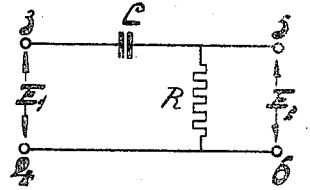
*Fig.1.* *Fig.2.*
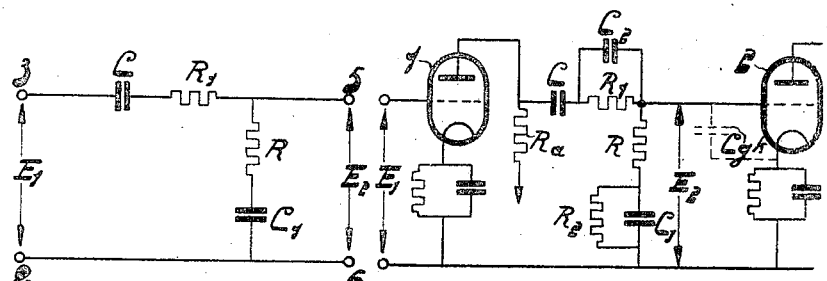
*Fig.3.* *Fig.4.*
INVENTOR
JOHAN HAANTJES
BY
AGENT Patented Jan. 17, 1950

2,494,657

UNITED STATES PATENT OFFICE 2,494,657

AMPLIFIER COUPLING NETWORK

Johan Haantjes, Eindhoven, Netherlands, assignor to Hartford National Bank and Trust Company, Hartford, Conn., as trustee Application February 11, 1947, Serial No. 727,852
In the Netherlands March 11, 1944

Section 1, Public Law 690, August 8, 1946
Patent expires March 11, 1964

2 Claims. (Cl. 179—171)

In view of suppressing or at least reducing the linear distortion in resistance-condenser coupled amplifiers, which is manifest by an amplification characteristic dropping towards the low frequencies, it is known to connect in series with the resistance $R_a$ in the anode circuit of an amplifying tube 1 (see Fig. 1), a condenser $C_1$ which is shunted by a resistance $R_1$ in regard to the direct anode current. When choosing $C_1$ in such a manner as to satisfy the relation:

$$\frac{C}{C_1} = \frac{R_a}{R_g}$$

where C designates the coupling condenser and $R_g$ represents the leakage resistance in the grid circuit of the next amplifying tube 2, the amplification i. e. the ratio of the voltages $E_2/E_1$ is independent of the frequency even in regard to very low frequencies.

This solution, however, is only serviceable if the internal resistance of the amplifying tube 1 is high with respect to the total impedance of the anode circuit. In the case of this condition not being satisfied, so that the internal resistance is low relatively to the total impedance in the anode circuit, the voltage across the series connection of $R_a$ and $C_1$ will be free from linear distortion and, due to the frequency-dependent voltage distribution over C and $R_g$, a frequency-dependent voltage is set up across $R_g$. Hence, the amplification $E_2/E_1$ is dependent with respect to the frequency, in other words linear distortion occurs.

The same problem is generally encountered in circuits for the transmission of alternating voltages having different frequencies, which appear between a pair of input terminals 3, 4 (vide Fig. 2) to a pair of output terminals 5, 6, the two pairs of terminals being decoupled in regard to direct current by means of a condenser C, and a resistance R being interposed between the output terminals. The condenser C brings about an output voltage which decreases with a decrease in frequency, so that the voltage ratio $E_2/E_1$ is dependent with respect to frequency in regard to low frequencies.

According to the invention, in order to obtain a practically distortion-free transmission, a resistance $R_1$ is connected in series with the condenser C and a condenser $C_1$ is connected in series with the resistance R, whilst $R_1$ and $C_1$ are so chosen as to satisfy the relation $$\frac{C}{C_1} = \frac{R}{R_1}$$

Fig. 3 represents the circuit arrangement according to the invention. An analysis of the voltages existing across the impedances at $E_2$ and $E_1$ can be determined by Kirchoff's law:

$$E_2 = I\left(R + \frac{1}{j\omega C_1}\right) \qquad (1)$$

and, $$E_1 = I\left(R + \frac{1}{j\omega C} + R_1 + \frac{1}{j\omega C_1}\right) \qquad (2)$$

therefore, $$\frac{E_2}{E_1} = \frac{R + \frac{1}{j\omega C}}{R + \frac{1}{j\omega C} + \frac{1}{j\omega C}} \qquad (3)$$

$$\frac{E_2}{E_1} = \frac{R}{R + R_1} \cdot \frac{1 + \frac{1}{j\omega C_1 R}}{1 + \frac{\frac{1}{j\omega C} + \frac{1}{j\omega C_1}}{R + R_1}} \qquad (4)$$

If the chosen value is substituted as given above, where $$\frac{C}{C_1} = \frac{R}{R_1}$$

then $$\frac{E_2}{E_1} = \frac{R}{R + R_1}$$

$$E_2 = E_1 \frac{R}{R + R_1}$$

from which it appears that the voltage ratio is independent of the frequency.

Fig. 4 depicts the use of the circuit according to the invention in a resistance-coupled amplifier. It is assumed that the internal resistance of the first amplifying tube 1 is low with respect to the total impedance in the anode circuit which is constituted by the parallel-connection of the anode resistance $R_a$ and the series-connection of the coupling condenser C, the resistances $R_1$ and R and the condenser $C_1$. When this condition is satisfied the amplified voltage across $R_a$ is practically undistorted. In the case of the elements C, $C_1$, R and $R_1$ being proportioned according to the invention a likewise undistorted voltage $E_2$ is set up across R and $C_1$ in the control-grid circuit of the amplifying tube 2, so that the total amplification $E_2/E_1$ is independent with respect to frequency.

In order that a suitable negative grid bias may be fed to the control-grid of tube 2 it is necessary to shunt the condenser $C_1$ by a resistance $R_2$. This expedient affects the amplification in such a sense that the amplification yet becomes dependent with respect to frequency in regard to very low frequencies, it is true, but if the resistance $R_2$ is so chosen as to be high, in regard to the lowest frequency to be amplified, with respect to the reactance of condenser $C_1$, this influence will practically not disturb.

In the amplifying circuit shown in Fig. 4 the grid-cathode capacity $C_{gk}$ available between the grid and the cathode of the amplifying tube 2 involves a dropping amplification characteristic at high frequencies. This disturbance can be made up for by connecting a condenser $C_2$ in parallel with the series connection of C and $R_1$ or, which in practice comes to the same, in parallel with $R_1$ and by giving it such a size that $$\frac{C_2}{C_{gk}} = \frac{R}{R_1}$$

Of course, the same expedient may also be used in the circuit shown in Fig. 3, if a certain capacity be available between the output terminals 5, 6.

What I claim is:

1. An electric circuit arrangement comprising a pair of input terminals, a pair of output terminals, a first capacitive element having a value C and a first resistive element having a value $R_1$ connected in series between one of the said input and one of said output terminals, a second capacitive element having a value $C_1$ and a second resistive element having a value R connected in series between the said output terminals, and the said circuit elements relating in magnitude according to the equation:

$$\frac{C}{C_1} = \frac{R}{R_1}$$

2. An electric circuit arrangement comprising a first thermionic discharge tube having a cathode, grid and anode, a second thermionic discharge tube having a cathode, grid and anode, said second thermionic discharge tube having further a capacity between the grid and cathode having a value $C_{gk}$, and means to couple the anode-cathode circuit of said first thermionic discharge tube to the grid-cathode circuit of said second thermionic discharge tube, said latter means comprising a first capacitive element having a value C and a first resistive element having a value $R_1$ connected in series between the anode-cathode circuit of said first thermionic discharge tube and the grid-cathode circuit of said second thermionic discharge tube, a second capacitive element having a value $C_1$ and a second resistive element having a value R connected in series in the grid-cathode circuit of said second thermionic discharge tube, a third capacitive element having a value $C_2$ in parallel with said first resistive element, and the said circuit elements relating in magnitude according to the equation:

$$\frac{C}{C_1} = \frac{R}{R_1} = \frac{C_2}{C_{gk}}$$

JOHAN HAANTJES.

REFERENCES CITED

The following references are of record in the file of this patent:

UNITED STATES PATENTS

| Number | Name | Date |
|---|---|---|
| 2,045,316 | Stocker | June 23, 1936 |
| 2,120,823 | White | June 14, 1938 |
| 2,212,205 | Hepp | Aug. 20, 1940 |
| 2,243,121 | Preisman | May 27, 1941 |
| 2,275,023 | White | Mar. 3, 1942 |